UNITED STATES PATENT OFFICE.

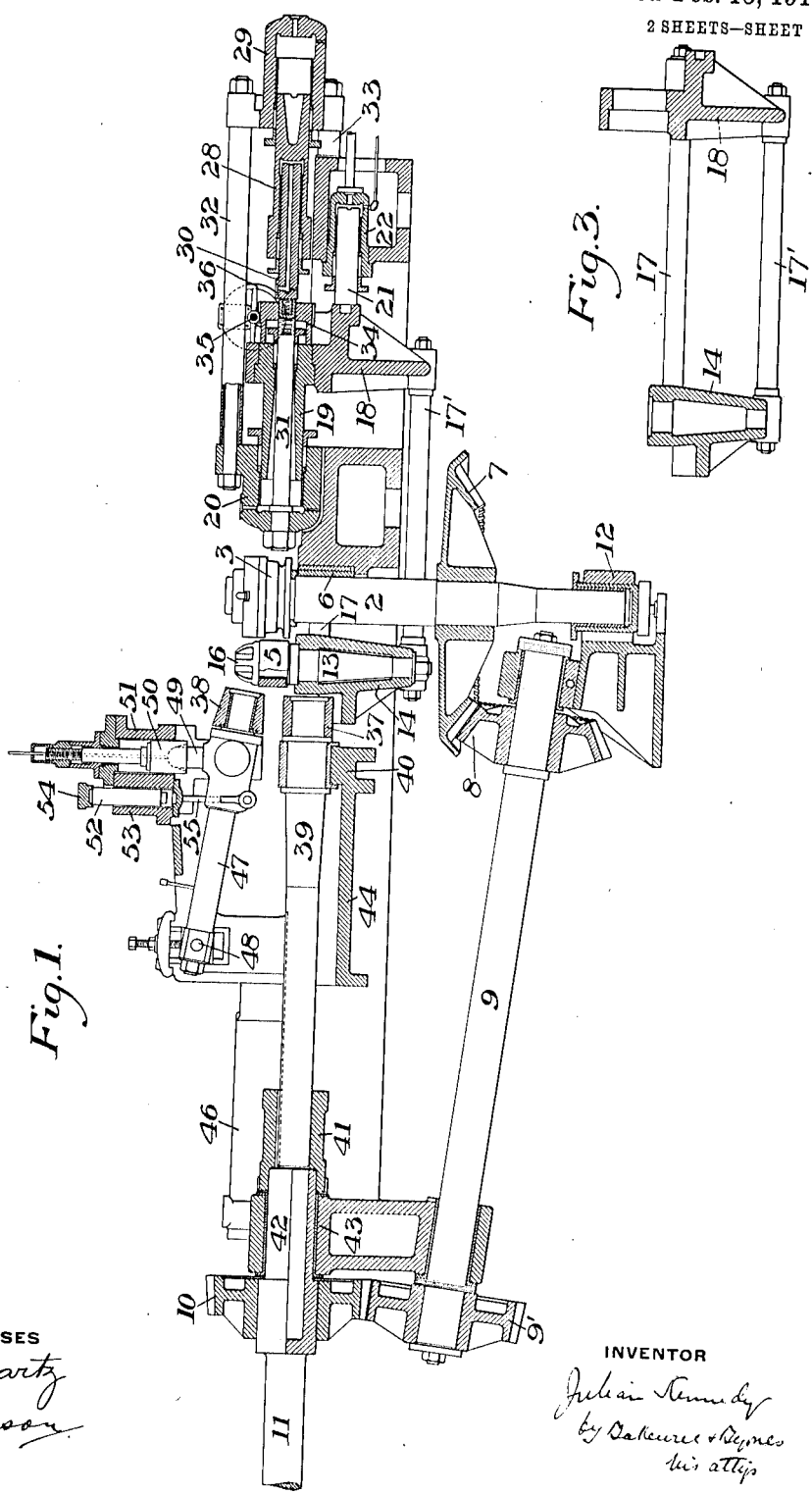

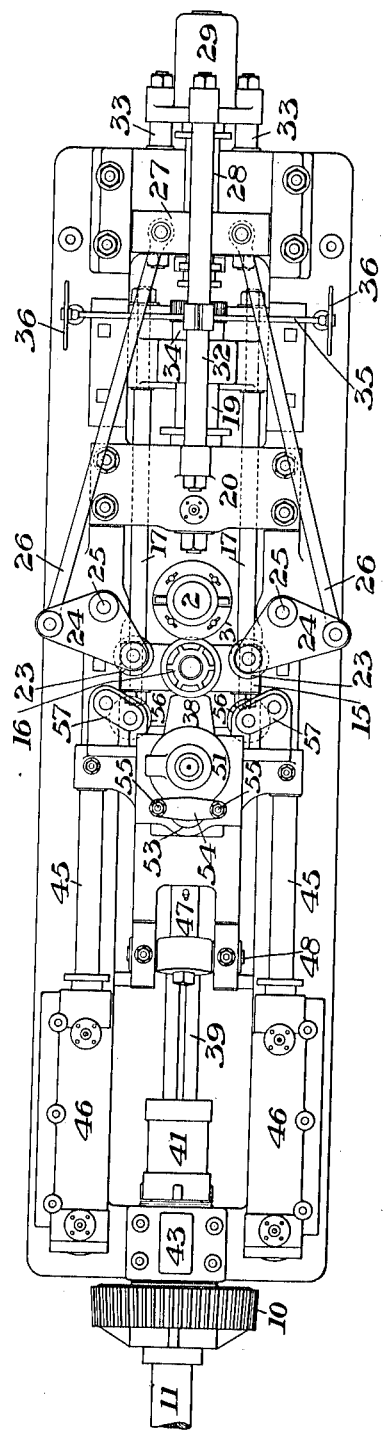

JULIAN KENNEDY, OF PITTSBURG, PENNSYLVANIA.

TIRE-ROLLING MILL.

949,279.

Specification of Letters Patent. Patented Feb. 15, 1910.

Application filed December 11, 1906. Serial No. 347,290.

*To all whom it may concern:*

Be it known that I, JULIAN KENNEDY, of Pittsburg, Allegheny county, Pennsylvania, have invented a new and useful Tire-Rolling Mill, of which the following is a full, clear, and exact description, reference being had to the accompanying drawings, forming part of this specification, in which—

Figure 1 is a sectional side elevation of a tire mill constructed in accordance with my invention; Fig. 2 is a top plan view of the same; and Fig. 3 is a detail view.

My invention relates to the class of tire rolling mills, and particularly to the mill set forth in my United States Letters Patent No. 432,625, dated July 22nd, 1890, for tire rolling machine.

The object of the invention is to simplify and improve the construction of the machine, and also to render its operation easier and more rapid.

In the drawings, 2 represents the driven shaft of the main roll 3 which operates on the exterior periphery of the tire, 5 being the frictionally driven roll which operates on the inner periphery thereof. The shaft 2 is journaled in suitable stationary bearings 6 in the frame of the machine, and is driven by any suitable power connections, for example, by the bevel gear 7 driven by bevel pinion 8 on the inclined shaft 9, which may be driven by the intermeshing wheels 9' and 10 from the horizontal shaft 11. I have shown the shaft 2 as mounted at the lower end in a suitable bearing 12.

The shaft 13 of the roller 5 is journaled in a head or casting 14 which projects upwardly from a cross-head 15, the roller turning loosely upon the shaft 13 which projects through it, and is provided with an upper nut or securing means 16. The cross-head 15 is connected by four rods 17 and 17' with a rear cross-head 18, the upper part of which is secured to the main plunger 19 of a single-acting hydraulic cylinder 20. The axial center of the cylinder 20 is in line with the center of the face of the roll 5, and when pressure is admitted to the cylinder 20 it acts through the rods 17 to pull the roller 5 toward the stationary roller 3. Below the level of the plunger 19 and preferably in vertical alinement therewith, a pull-back plunger 21 is secured to the rear part of the cross-head 18, this plunger 20 moving in a single-acting hydraulic cylinder 22. Fluid under constant pressure is preferably applied to the cylinder 22 which acts to push the roller 5 away from the cylinder 3 whenever pressure is released in the main cylinder 20.

The guide rollers 23 bear on the exterior of the tire bloom at the sides of the pressing roller 5, and are journaled in bearings in bell crank levers 24 which are pivoted to parts of the frame at 25 on opposite sides. The other arms of these bell crank levers are connected by pivotal links 26 to a crosshead 27 secured to the plunger 28 of a rear single-acting hydraulic cylinder 29. The axis of the cylinder 29 is preferably in alinement with the axis of the cylinder 20 and in connection with it I preferably employ a pull-back device in the form shown. This pull-back device consists of a stationary plunger 30 which is within a cylinder cavity in the plunger 28, this plunger performing the functions both of a plunger and a cylinder. The small pull-back plunger 30 is shown as secured to the outer end of a stem 31 extending through and secured to the head of the cylinder 20, and a constant pressure is preferably supplied to the interior of the cylinder plunger 28. Whenever pressure is released in the cylinder 29, the plunger 30 will act to force back the plunger 28 and release the guide rollers 23. The cylinders 20 and 29 are preferably connected by rods or bolts 32 above their level, and bolts 33 are also employed for the plunger 29 below its level, these being secured to the frame of the machine.

In order to limit the movement of the plunger 19 in drawing the pressing roller toward the stationary roller, I provide a stop, shown as consisting of a nut 34 which surrounds the stationary stem 31. This nut may be adjusted by means of a worm shaft 35 extending across and above it and intermeshing with suitable teeth cut on the circumference of the nut, the shaft having hand wheels 36. By turning the hand wheels, the position of the nut may be adjusted so as to regulate the throw of the plunger 19, and consequently the final pressing position of the roller 5.

37 and 38 are edging rolls which operate on the edges of the tire. The lower roll 37 is secured to the end of a rotary shaft 39, supported in suitable bearings 40 and 41. The bearing 40 is fixed, while the bearing 41 is a coupling screwed to the hollow extension 42 of the driving shaft 11. This extension is supported within a bearing 43; and the shaft 39 is splined to the collar or coupling 41 so that the roller 37 will be positively rotated while the shaft 39 may move endwise into the cavity in the end of the shaft 42. The bearing 40 is carried on a reciprocating frame or head 44 movable in suitable guides on the frame and actuated by the piston rods 45 of hydraulic cylinders 46. In the upper part of the head or frame 44 a shaft 47 is pivoted at 48, this shaft carrying roll 38 and extending through a bearing carried by stem 49. The stem 49 is loosely attached to the plunger 50 of a hydraulic cylinder 51 which acts to force the roll 32 down on the rim of the tire.

52 is a pull-back plunger moving within cylinder 53 and having a top cross head 54 pivotally connected by links 55 to the bearing of shaft 47.

56 are guide rollers, which bear on the exterior of the tire bloom at the sides of the rollers 37 and 38. These guide rollers are mounted on links 57 pivoted to projections from the head 44.

The advantages of my invention result from the simplifying and strengthening of the machine shown in my previous patent above referred to. The peculiar connection between the pressing roller and its plunger brings the axis of the plunger into line with the axis of the pressing roll, while the connections between them extend below the tire blank. The stop for limiting the movement of the pressing roller is in line with the hydraulic cylinder, and acts directly while it is not liable to become broken in use. The inclining of the shaft 9 and its connection to the shaft 11 avoids the placing of the engine in a pit.

The entire construction is rigid and substantial in character, and is simplified and made longer lived.

Variations may be made in the form and arrangement of the parts without departing from my invention.

I claim:—

1. In a machine for rolling annular blooms, a main roll mounted on the end of a vertical shaft, a pressing roll, a hydraulic cylinder having its axis in line with the center of the face of the pressing roll, and connections between the hydraulic cylinder and the carrier for the pressing roll, all of said connections being below the level of the pressing roll; substantially as described.

2. In a machine for rolling annular blooms, a main roll, a compressing roller mounted on a vertical head, a hydraulic cylinder on the opposite side of the main roll and in line with the center of the face of the pressing roll, said hydraulic cylinder having a piston provided with a depending head, and connections between said depending head and the support for the pressing roller, all of said connections being below the level of the pressing roller; substantially as described.

3. In a machine for rolling annular blooms, a main roll, a pressing roller, a hydraulic cylinder on the opposite side of the main roll and connected to the pressing roller, side guide rollers, and a second hydraulic cylinder in line with the first hydraulic cylinder and connected to the guide rollers the last mentioned cylinder being on the same side of the machine and to the rear of the first cylinder; substantially as described.

In testimony whereof, I have hereunto set my hand.

JULIAN KENNEDY.

Witnesses:
F. McClain,
A. McB. Rex.